United States Patent [19]

Koutsoupidis

[11] Patent Number: 4,789,115

[45] Date of Patent: Dec. 6, 1988

[54] VTOL AIRCRAFT

[76] Inventor: Theodore Koutsoupidis, 12404 Harbor Dr., Woodbridge, Va. 22192

[21] Appl. No.: 901,634

[22] Filed: Aug. 29, 1986

[51] Int. Cl.$^4$ ............................................. B64C 27/26
[52] U.S. Cl. ........................................ 244/6; 244/215
[58] Field of Search ................... 244/6, 7 R, 215, 119, 244/7 A

[56] References Cited

U.S. PATENT DOCUMENTS

| | | | |
|---|---|---|---|
| 2,096,599 | 10/1937 | Thomas | 244/6 |
| 2,369,152 | 2/1945 | Lowell et al. | 244/215 |
| 2,389,798 | 11/1945 | Main | 244/6 |
| 2,397,526 | 4/1946 | Bonbright | 244/91 |
| 2,874,922 | 2/1959 | Whitcomb | 244/119 |
| 3,106,369 | 10/1963 | Borst | 244/7 R |
| 3,260,476 | 7/1966 | James | 244/7 R |

FOREIGN PATENT DOCUMENTS

| | | | |
|---|---|---|---|
| 735472 | 11/1932 | France | 244/6 |
| 383176 | 12/1964 | Switzerland | 244/6 |

Primary Examiner—Galen Barefoot
Assistant Examiner—Rodney Corl
Attorney, Agent, or Firm—Wigman & Cohen

[57] ABSTRACT

An aircraft having vertical take-off and landing capability including a nozzle-shaped fuselage housing a power-generating mechanism, a propulsion-developing mechanism at the rear end, and laterally-extending wings located forwardly of the rear end. Each wing includes an aerodynamically composite airfoil having a lower surface possessing a camber curvature. A propeller is provided at the free end of each wing for rotation in a plane parallel to the plane of the wing. The lower surface of each wing includes a thrust flap which may be moved between a first position in which the flap coincides with the camber curvature of the wing lower surface and the propeller provides primarily lift, and a second position in which the flap projects below the camber curvature of the wing lower surface to cooperate with the propeller to compress the flow of air therebetween thereby generating thrust useful for propelling the aircraft in a forward direction.

14 Claims, 5 Drawing Sheets

VTOL AIRCRAFT

BRIEF SUMMARY OF THE INVENTION

The present invention relates to aircraft, such as airplanes and helicopters, and more particularly to a VTOL aircraft having a wing including a rotor supported on the tip of each wing laterally rotating and towards the longitudinal axis of said Craft's wings to generate lift for vertical take off or landing (V.T.O.L.) and a thrust-flap to generate thrust between the wing's aerofoil and the rotors.

The main object of this invention is to provide a superior wing for an aircraft. The wing, in conjunction with the rotor and thrust-flap, generates lift and thrust simultaneous or independently.

A further object of this invention is to increase the wind velocity relative to the wing by means of the rotors to increase lift force.

Another object of this invention is to provide the fuselage tail of the aircraft with a divergent-convergent nozzle configuration to create air-pressure at the tail-propeller thereby creating further thrust for propulsion.

A further object of this invention is to replace part of the initial stage blades of an aircraft's compressor with the wing's rotor.

A still further object of this invention is to dispose a rotating tail nozzle in a horizontal position parallel to the longitudinal axis of the aircraft's fuselage to generate thrust for propulsion and being rotatable to any position between longitudinal and vertical positions for V.T.O.L. or rolling.

BRIEF DESCRIPTION OF THE DRAWINGS

The drawings schematically illustrate by means of example, and not by way of limitation, several embodiments of the invention in which corresponding numbers designate corresponding parts in the several views, and in which.

DETAILED DESCRIPTION OF THE INVENTION

The invention, the scope thereof being defined in the appended claims, is not limited in this application to the details of manufacture, construction and arrangement of parts illustrated and described, since the invention is capable of other embodiments based on the principles of this invention carried out in various other ways. Also, it is understood that terminology or phraseology or symbolism used herein is for the purpose of description.

The VTOL Craft described hereinafter takes the form of three basic embodiments:
  (a) a supersonic embodiment;
  (b) a subsonic embodiment; and
  (c) a light embodiment.

(A) ALL EMBODIMENTS IN GENERAL

The principles underlying the present invention are applicable to all the above-mentioned embodiments, conserve energy by increasing the efficiency of operation of supersonic and subsonic aircrafts, as well as helicopters, by increasing the lift force. With higher lift force and with the same horsepower, the VTOL aircraft can achieve greater speed and range. From the fundamental equation of lift (see equation (a) below), the wind velocity relative to the wing is directly proportional to the lift force. The speed of the rotor located below the wing increases the velocity of the wind relative to the wing as a result of which the force of lift is further increased. As the lift and weight are opposite forces, the greater the lift force relative to the weight, the less power is needed for propulsion for the VTOL craft.

Fundamental equation of lift:

$$L = C_L \rho 2 V^2 S$$

where $C_L$ = Lift coeff.; V = velocity; S = airfoil area.

Figure 1:
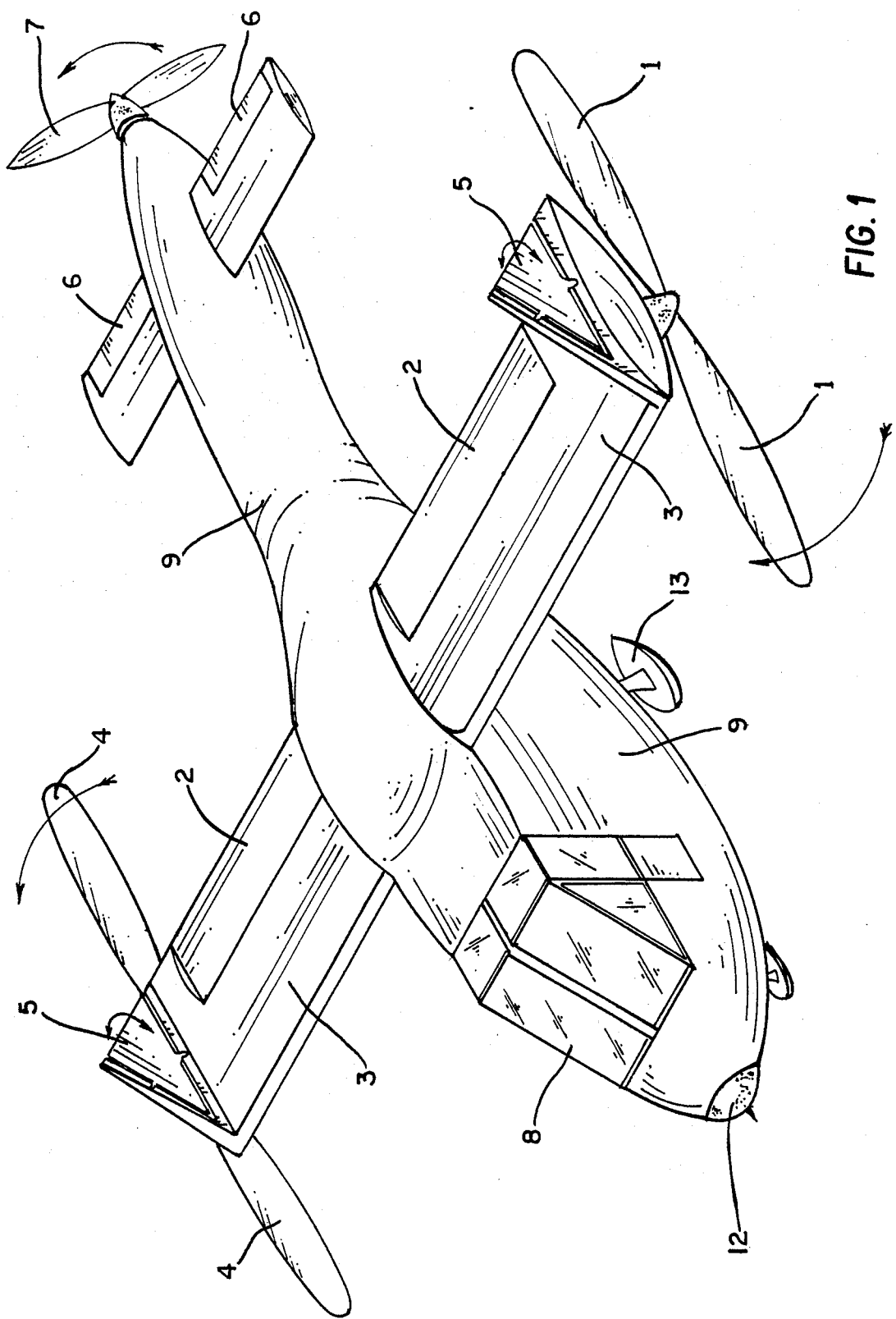
FIG. 1 is a perspective view of a first embodiment of the VTOL Craft of the present invention.
Figure 2:
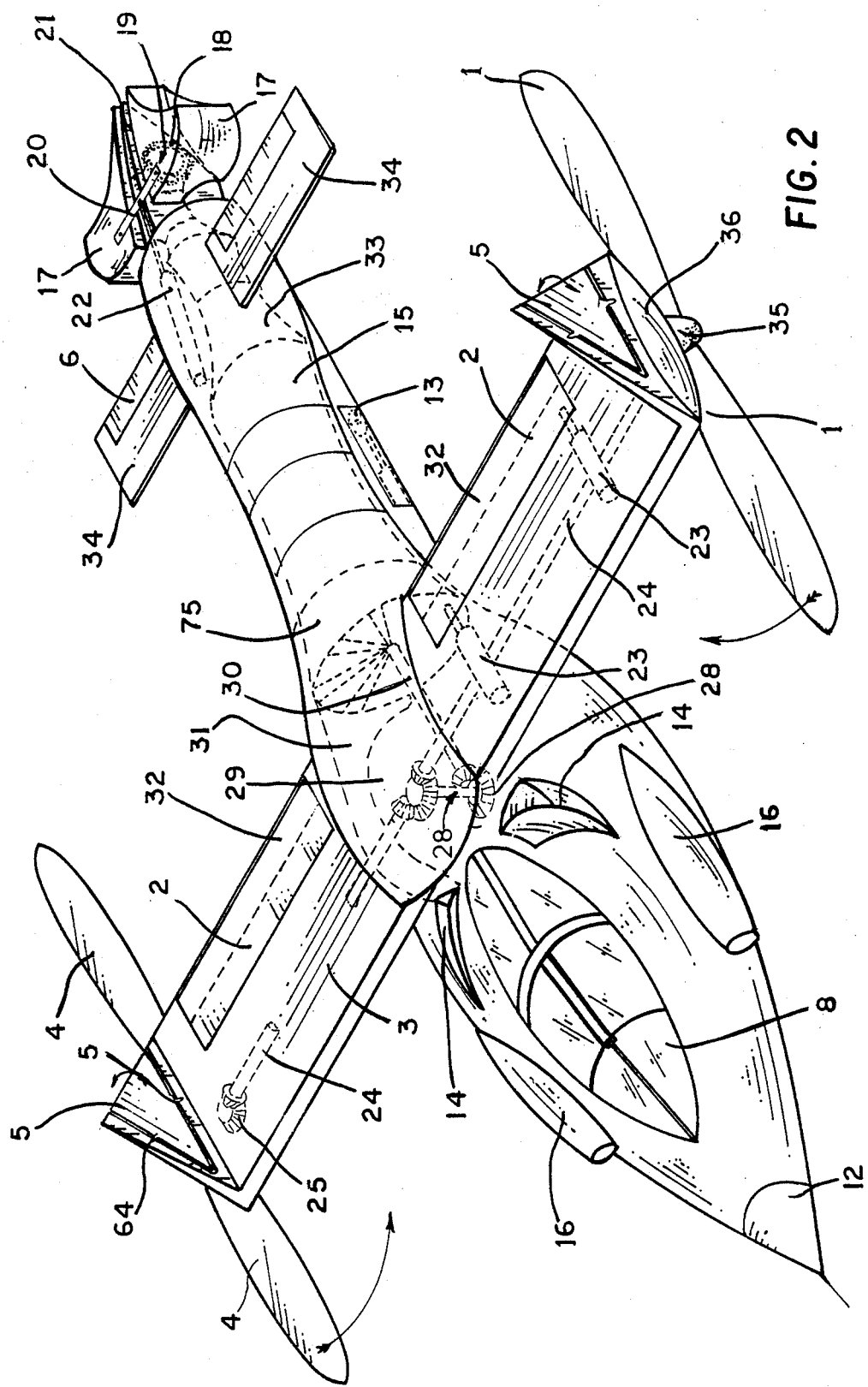
FIG. 2 is a perspective view of a second supersonic embodiment of the VTOL Craft.
Figure 6:
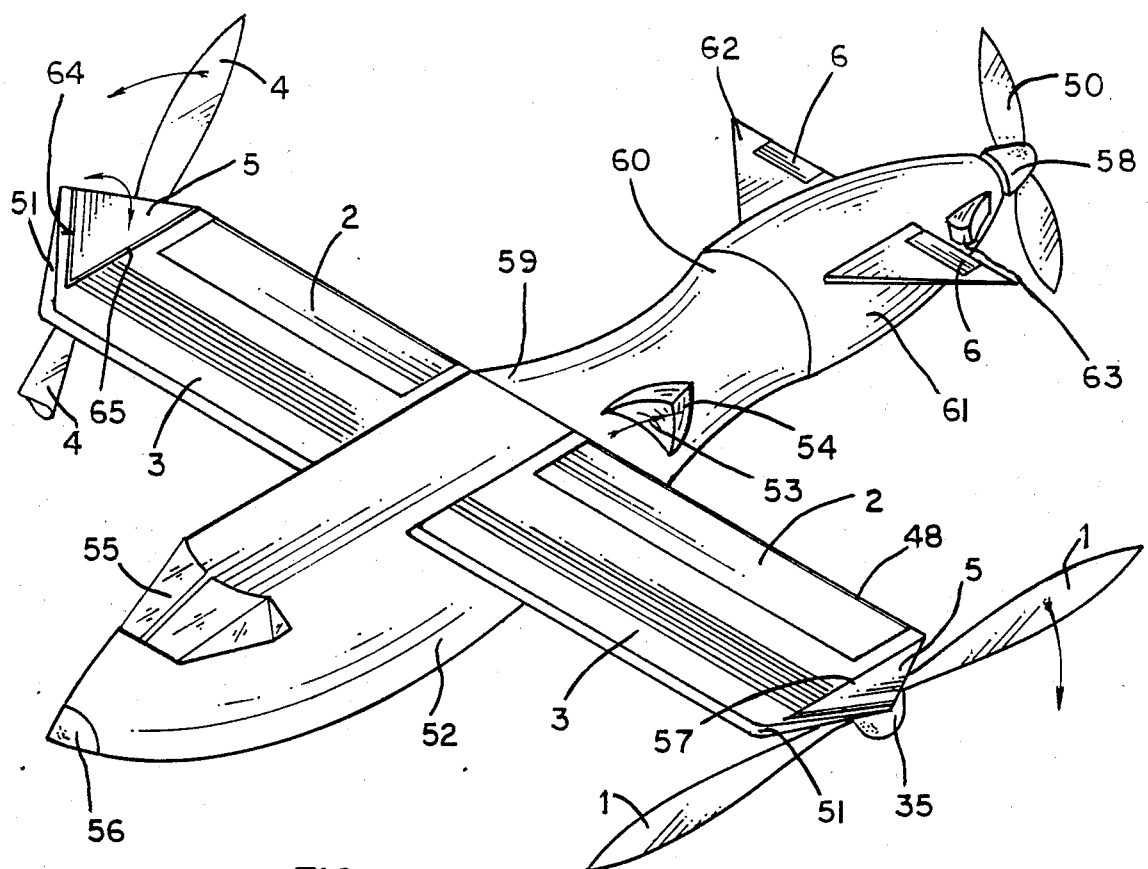
FIG. 6 is a schematic perspective view of a third, subsonic, embodiment of the VTOL Craft of the present invention.

As shown in each of FIGS. 1, 2 and 6, each wing 2 of the "VTOL craft" is supported by the fuselage 9. A rotor 1, 4 is attached at each wing tip. The rotor is of a fixed pitch and is designed, when rotating, to make the "VTOL craft" hover. The right rotor 4 is shown to be rotating clock-wise while the left rotor 1 is shown to be rotating counter-clock-wise. Thus the general torque from the rotors is in balance. The rotors are caused to rotate via shafts 24, 24 which extend through the wings. The shafts are driven by Bevel gears 29, 70, 70'. The Bevel gears can be driven by the crankshaft of an internal combustion engine or turbine engine.

A vertical stabilizer 5 and rudder is disposed on each wing tip above the rotor's spinner, thus increasing further the stability and yawing moment of the "VTOL craft".

The fuselage 9 and the tail of the "VTOL craft" are provided with a convergent-divergent nozzle shape. The throat of the convergent nozzle is connected to the fuselage and at the throat of the divergent nozzle the tail propeller 7 is attached. A pair of horizontal stabilizers 6, 6 are provided at the tail of the "VTOL craft".

The tail propeller can be driven by a shaft 72 (see FIG. 7) from the same engine 66 which drives the rotors at the wing tip. The tail propeller can also be driven by an internal combustion engine located at the tail of the "VTOL craft's" fuselage. In this case, the shaft which drives the tail propeller will preferably be connected to a clutch 73 to neutralize the tail propeller during take off or landing.

The wings of the aircraft function to simultaneously create lift and generate thrust, while the rotors function to make the "VTOL craft" hover and compress air on the airfoil of the wing, based on the principles underlying this invention.

For military purposes (see FIG. 2), the tail propeller 7 can be replaced by a nozzle 19 and a turbine 75 can be placed in the fuselage at a middle position after the wings. In the embodiment of FIG. 6, an internal combustion engine drives the rotors while a small turbine creates thrust for propulsion by means of pivotable nozzles 63 and also drives the tail-propeller 50.

(B) THE SUPERSONIC EMBODIMENT

FIG. 2 illustrates a "VTOL aircraft" having vertical take-off or landing capability, a nozzle shaped fuselage, and wings 3 have an aerodynamic composite airfoil. Each of the wings supports a pivotally mounted thrust-flap 2, 32 located at the lower camber curvature or trailing edge. The thrust-flap selectively changes the aerodynamic effects by deflecting chordwise airflow to form a combined convex-concave lower camber curvature or one extending chordwise to conform with the conventional camber's lower curvature design profile. Lifting and propulsion is generated by means of rotors 1, 4 fixedly mounted on the wing's frame at the wing tip 36. Wing tip 36 includes a cowling to accommodate bevel gear 25 and spinner 35. The rotors 1, 4 generate thrust when the thrust-flap 2, 32 is deflected. The rotors 1, 4 generate the lift when the thrust-flap 2, 32 is extended. Angular stabilizers and rudders 5 are located at the wing tip opposite to rotors 1, 4 at a designated angle of 45°–85° between the vertical and lateral axis of the wing 3. The total wing span of the "VTOL aircraft" is the length of the wings 3 plus the length of each wing's rotor blade 1, 4. The wings 3 in conjunction with the rotors 1, 4 and thrust-flap 2, 32 generate lift and thrust simultaneously or independently. The thrust-flap 2, 32 are extended or retracted by means of at least two hydraulic cylinders 23 connected to the wing's frame and a lever arm coupled to the thrust-flap platform 2. Openings 14 are positioned directly in front of the leading edge of the wing. The opening 14 is diagonally in alignment with the lateral axis of the fuselage, and the rotors 1, 4 cause part of the airstream 10 (see FIG. 3) to enter the opening leading to the turbine compressor 75 of the aircraft. On each side of the aircraft, between the nose 12 and fuselage 9, a case 16 is attached to accommodate weapons, missiles or the like. The rotors 1, 4 are provided with fixed pitch and fixed blades, and are designed to create lift. During supersonic flight, the rotors 1, 4 do not create dynamic forces on the wings because they are aligned with the airstream 10. The rotors 1, 4 are driven by means of at least one hollow shaft 24 attached to a bevel gear arrangement 29, 28, 27 by means of at least one turbine. The bevel gear arrangement 29, 28, 27 is powered by means of the turbine's extended shaft 30 attached to the lower bevel gear 27. The tail nozzle 19 discharges combustion gases through holder 18 into the pivotable-nozzle. The holder 18 is a tube with extended lip edges to engage the pivotable-nozzle 17, and is capable of rotating about the holder's axis.

Figure 8:
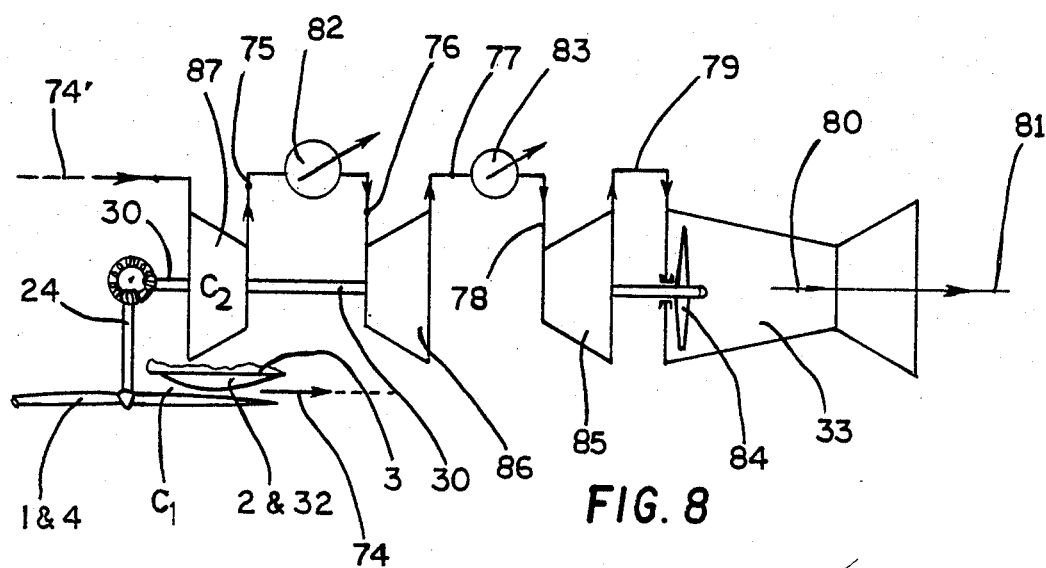
FIG. 8 schematically illustrates the multi-stage turbine used in the "VTOL aircraft" of FIG. 2.
Figure 9:
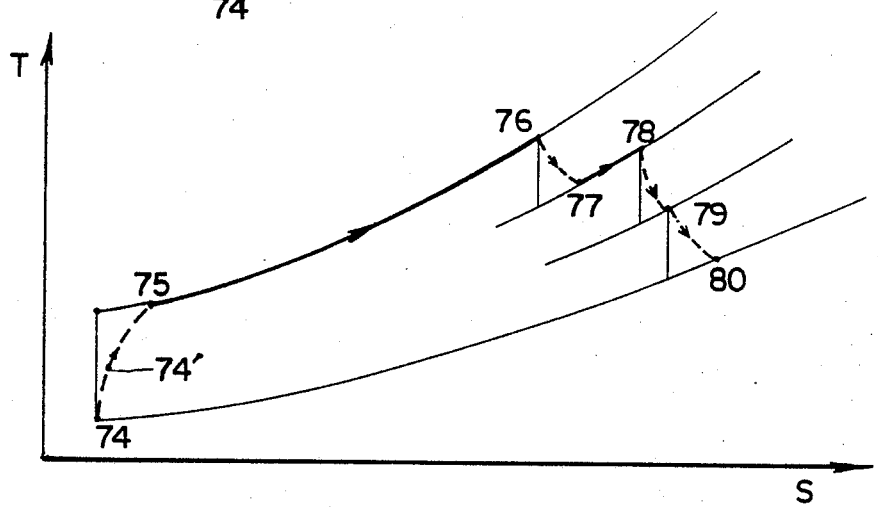
FIG. 9 is a temperature vs. entropy graph of the turbine of FIG. 8.

FIG. 8 illustrates the turbine system assembly for propulsion of the aircraft shown in FIG. 2, which includes:

a. a two-stage compressor which consists of a first stage compressor $C_1$ having blades located at the wing's tip rotors 1, 4 for generating thrust between the thrust-flap 2, 32 and the wing 3, and for forcing part of airstream 10 to enter opening 14; and a second stage high-pressure-compressor $C_2$ attached to the shaft 30 driven by a high-pressure-turbine 87;

b. two burners including a first burner 82 located between the high-pressure compressor $C_2$ and the high-pressure-turbine 86, and a second burner 83 located between the high-pressure-turbine 86 and the low-pressure-turbine 85; and c. a three-stage turbine which includes a first stage high-pressure-turbine 86 for driving the H-P-compressor 87 and rotors 1, 4 of the first stage compressor $C_1$; a second stage low-pressure-turbine 85 for discharging combustion gases from the H-P-turbine 86 and the burner 83 at high speeds into a divergent-confergent nozzle 33; and a third stage turbine 84 located in the divergent nozzle 33 to further accelerate the exhaust gases into the holder 18 and the pivotable-nozzle 17.

The pivotable nozzle 17 is located and supported on the tail 21 of the fuselage. The pivotable-nozzle 17 is divided into two segments each discharging combustion gases exiting from the divergent-convergent nozzle 33. The pivotable-nozzle's segments are supported and rotated between longitudinal and vertical axes for vertical take-off, landing or rolling by means of at least one adjusting hydraulic cylinder 22 and rod 20 disposed at the top of the nozzle 33 and at the lower base of the nozzle 33. The segments are fixed by means of a holder 18 to the frame of the tail 21. The turbine employed in this aircraft is not disclosed in detail in this description or in the drawings; instead, schematic views are used to illustrate by means of example the propulsion system of the VTOL aircraft of this invention.

Figure 3:
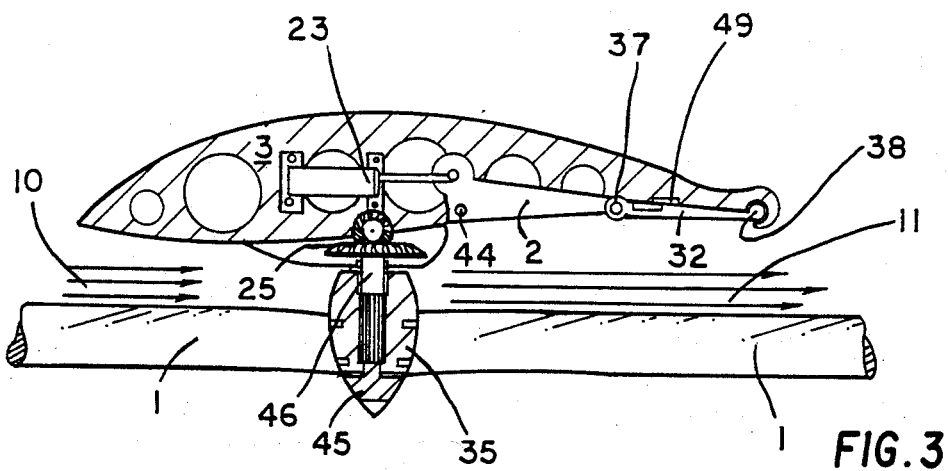
FIG. 3 is a schematic view partially in cross-section to illustrate the function of the thrust-flap when extended.

FIG. 3 illustrates the wing 3 with the thrust-flap 2, 32 retracted. In this position, the pressure of airstream 10 between the rotor 1 and the wing lower camber is unaffected, and the airstream 10 passes the thrust-flap 2, 32 unaffected as seen at 11. The thrust-flap platform is divided into a first flap portion 2 and a second flap portion 32. The first flap portion 2 is pivotably attached to a lever arm. The second flap portion is pivotably held at the trailing edge 48 of the wing 3 by means of a cylindrical rod 38 formed at the edge of the flap portion 2 and accommodated in a housing 48 at the wing's trailing edge. A small leaf-spring 49 is provided at the wing's trailing edge to force the second flap portion 32 downwardly at the beginning of the deflection movement of thrust flap 2, 32. The flap portions are pivotably attached together. The rotor 1 is of fixed pitch and fixed blades attached on a spinner 35 driven by a shaft 46 and held on the shaft 46 by means of a spinner bolt 45. The shaft 46 is driven by means of bevel gears 25. The wing's frame supports the hydraulic cylinder 23. The lever arm of the first flap portion is attached to slot 42 in a beam by means of a rod 44.

Figure 4:
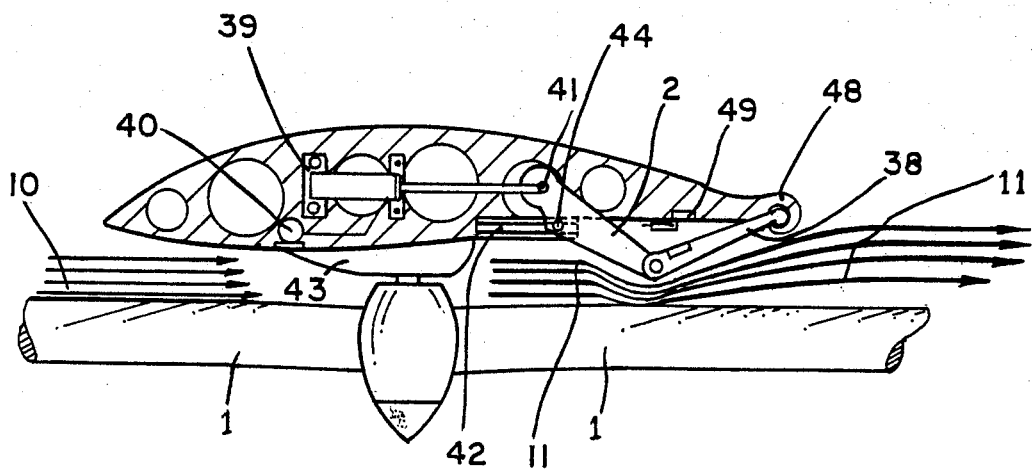
FIG. 4 is a schematic view partially in cross-section, to illustrate the function of the thrust-flap when deflected.

FIG. 4 illustrates the arrangement of the thrust flap and wing assembly when the flap portions are extended or deflected from the undersurface of the wing. When the thrust-flap is deflected, a convergent-divergent nozzle is created on the entire length of the trailing edge of the wing. An aerodynamic composite airfoil section is thus formed by extending or retracting chordwise thrust-flap 2, 32, thereby changing said airfoil's lower camber's profile by means of at least two adjusting hydraulic cylinders 23 connected on the wing's frame 39 and a lever arm coupled to the flap 2 to operable effect adjustments in the attitude assumed by the thrust-flap 2, 32. The lever arm is attached to slot 42 in a beam mounted on the underside of wing 3 by means of a rod 44 to guide its movement longitudinally of the wing's chord. The beam is supported by the wing's frame longitudinally of the chord. The bevel gears 25 are enclosed in a wing-cowling 43. The bevel gears 25 are driven by a means of a shaft 24 or 24' mounted on the wing's frame. The shaft 24 is powered by means of a bevel gears arrangement attached to at least one turbine or at least one internal combustion engine. The rotors 1, 4 are attached at the tip of each wing and both rotate towards the fuselage. When the thrust-flap 2, 32 is deflected, the airstream 10 is restricted forming airstream 11 thereby creating thrust at the end of the trailing edge. The hydraulic cylinder's pump is shown at 40.

Figure 5:
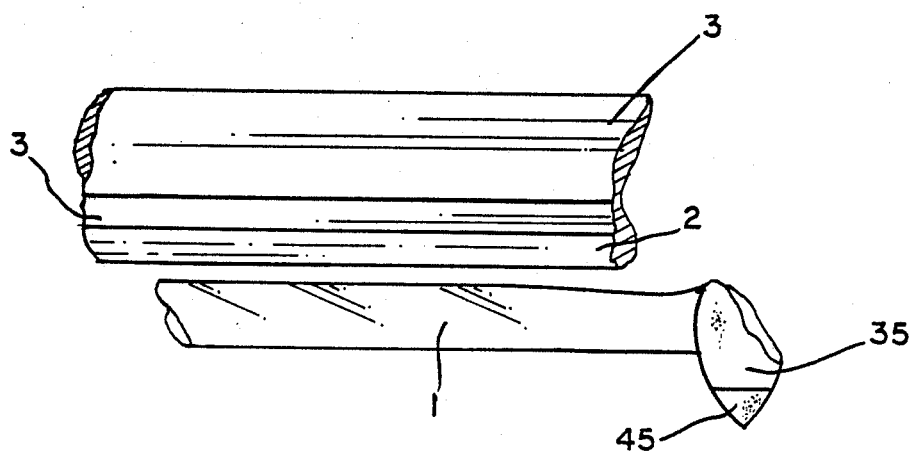
FIG. 5 is a schematic view of the wing of FIG. 4, looking forwardly, to illustrate the thrust-flap when deflected.

FIGS. 3, 4 and 5 are applicable to all three embodiments of the VTOL craft and illustrate the aerodynamic principles underlying this invention.

C. THE SUBSONIC EMBODIMENT

FIG. 6 illustrates a subsonic embodiment of the "VTOL craft" having vertical take-off or landing capability, and employing a nozzle-shaped fuselage. The wings have an aerodynamic composite airfoil, each of which supports a pivotally mounted thrust-flap 2, 32 located at the lower camber curvature or trailing edge as has been disclosed in FIGS. 3, 4 and 5 and described. The horizontal stabilizer 62 is located before the exhaust nozzle 63. The fuselage 52 has an opening 53 within said fuselage and directly underneath said wing's trailing edge. The opening intakes air from the ambient and guides it to the turbine's compressor located in the fuselage tail 61. The opening 53 is diagonally in alignment with the axis of the rotors 1 and 4. The rotors force part of the airstream to enter opening 53. Exhaust nozzle 63 is positioned underneath horizontal stabilizer 62 and elevator 6. The exhaust nozzle is pivotably mounted on the tail and is tiltable in the horizontal and vertical position. When exhaust nozzle 63 is in a vertical position, it is forwardly moving the "VTOL craft's" tail upwards, and when tiltable in horizontal position relative to longitudinal axis of the fuselage, the thrust generated by the turbine moves the "VTOL craft" forwardly in conjunction with the tail-propeller. In the subsonic embodiment of said "VTOL craft," the rotors and tail propeller 50 are driven by means of a combination of at least an internal combustion engine and at least one propfan in a thrust propulsion arrangement located in the fuselage and the tail. Collectively, or singly, the rotors 1, 4, the tail propeller 50 and the exhaust nozzle 63 generate thrust for vertical or horizontal motion. The fuselage tail is shaped in a divergent-convergent nozzle to increase and create high air presure at the tail propeller 50, and to generate more thrust. Angular stabilizers 51 and rudder 5 are located at the wing tip opposite to the rotors at a designated angle of between 45° and 87° inclination between the vertical and lateral axis of the wing. The bevel gear arrangement 27–29 drives the rotors by means of shafts 24, 24'attached to the second bevel gear 29. The first bevel gear 27 is driven from an internal combustion engine's crankshaft. Each rudder is tilted by means of a hinge 64 and a gear driven support 65. 60 denotes the beginning of the turbine in the tail 61.

D. THE LIGHT EMBODIMENT

FIG. 1 illustrates the "VTOL craft" light embodiment having vertical take-off or landing capacity with nozzle-shaped fuselage. The wings have an aerodynamic composite airfoil including a pivotably mounted thrust flap 2, 32 located at the lower camber curvature or trailing edge as has been disclosed in connection with FIGS. 3, 4, and 5. This embodiment of the "VTOL craft" is a propeller-driven, light version. The rotors 1, 4 and the tail propeller 7 both are driven by means of at least one internal combustion engine, the rotors and tail propellers generating thrust for horizontal motion and the rotors 1, 4 generating thrust for vertical or horizontal motion.

Figure 7:
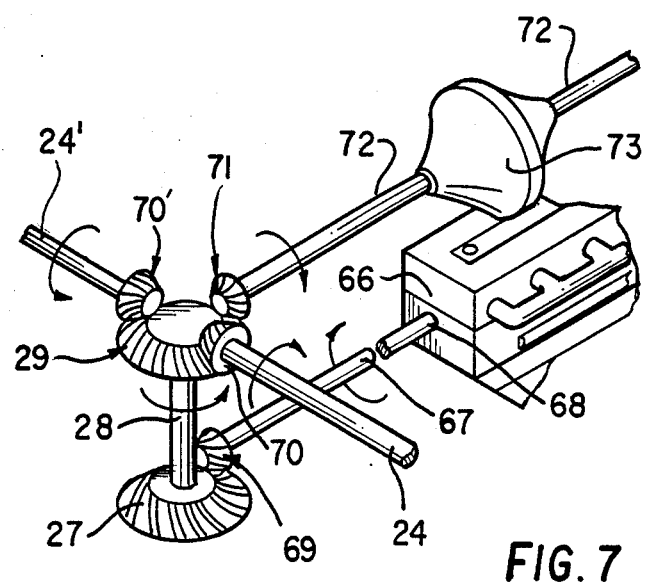
FIG. 7 is a schematic view to illustrate an arrangement of bevel gears provided for driving the rotors and the tail propeller.

FIG. 7 illustrates the bevel gear arrangement for the "VTOL craft" of FIG. 1 as including two bevel gears 27, 29 and a shaft 28. Bevel gear 27 is driven by means of an extended shaft 67 with a bevel gear 69 attached on shaft 67. The shaft 67 is attached to the crankshaft 68 of an internal combustion engine 66. Bevel gear 29 is attached to the bevel gear 27 by means of a shaft 28. Bevel gear 29 drives the shafts 24 and 24' by means of two bevel gears 70 and 70'attached on the shafts 24 and 24' and engaging the bevel gear 29. The tail propeller shaft 72 is connected to a clutch 73 for disengaging the tail propeller shaft from the tail propeller during take off or landing.

FIG. 6 illustrates in the "VTOL craft" the tail propeller being driven by means of a propfan. The shaft of the propfan driving the tail propeller is connected to a clutch to disengage the tail propeller from rotating during take-off or landing. The tail propeller 7 in FIG. 1 is rotating in a reverse direction from that rotation of the crankshaft 68 to balance the generated torque. The tail propeller shaft 72 is attached to a bevel gear 71 to engage the bevel gear 29 and can be connected to clutch 73 and a gear box.

E. IN ALL THREE EMBODIMENTS

The aerodynamic principles of the present invention are embodied in all three embodiments of the "VTOL craft." The rotors 1, 4 function to eliminate vortices at the wing tips. With one thrust flap 2, 32 extended and the other thrust flap 2, 32 retracted, the "VTOL craft" can be made to rotate about the lateral and vertical axis.

F. THE AERODYNAMIC PRINCIPLE OF THE PRESENT INVENTION

The wings of a "VTOL craft" function to create lift and/or generate thrust. When the thrust flap is retracted to conform with the conventional lower curvature camber profile, it has no effect on the flow of the airstream between the rotor and the wing's airfoil lower camber.

The rotation of the rotor causes the "VTOL craft" to function as a helicopter, or as a vertical take-off or landing aircraft. The fixed pitch of the rotors function to make the "VTOL craft" hover and compress the airflow on the wing's thrust flap to generate thrust.

When the thrust flaps are deflected at an angle with respect to the wing's lower surface, the air is compressed and then allowed to expand to generate thrust.

The thrust flap therefore functions as a selectively adjustable convergent-devergent nozzle. The thrust flaps extend laterally on the entire length of the wing.

The tail propeller, located at the tail of the VTOL craft of FIGS. 1 and 6, functions to generate thrust for propulsion to increase the total generated thrust, therefore increasing the speed of the "VTOL craft." For further increase of the total generated thrust of the "VTOL craft," the propeller and internal combustion engine may be replaced with a turbine as embodied in the aircraft shown in FIGS. 2 and 6.

The present invention is by no means limited to the examples described in the foregoing specification and illustrated in the accompanying drawings. The aircraft, the thrust flap, the control device for such a thrust flap, and/or the propulsion systems described, may be constructed in all sorts of combinations, shapes and dimensions without going beyond the scope of the invention.

I claim:

1. An aircraft having vertical take-off and landing capability, comprising:
    a nozzle-shaped fuselage housing power-generating means and supporting propulsion means at its rear end, said fuselage further supporting a pair of laterally extending wings at a location forwardly of said rear end,
    each of said wings comprising an aerodynamic composite airfoil having a lower surface possessing a camber curvature, each said wing further comprising
        (a) propeller means supported at the free end of said wing for rotation in a first plane substantially parallel to the wing,
        (b) means, selectively cooperable with said propeller means, for altering the camber curvature of said wing lower surface between a first configuration in which said altering means substantially coincides with the camber curvature of said wing lower surface, and a second configuration in which said altering means projects below the camber curvature of said wing lower surface toward said first plane, and
        (c) means for moving said altering means between said first and second configurations, said propeller means providing primarily lift when said altering means is in said first configuration, and said altering means, when in said second configuration, cooperating with said propeller means to compress the flow of air therebetween to generate thrust useful for propelling the aircraft in a forward direction.

2. The aircraft of claim 1, wherein said altering means comprises a thrust flap including a pair of hinged sections pivotally supported at the underside of each said wing, said sections being pivotable between a first relatively coextensive position corresponding to said first configuration and a second, angularly related position corresponding to said second configuration, and further comprising power cylinder means for moving said hinged sections between said first and second positions, said hinged sections comprising a first forward hinge section pivotally attached at a forward end portion to said wing and to said power cylinder means, and a second rear hinge section pivotally attached to said wing at a rear end portion.

3. The aircraft of claim 2, wherein one of said hinged sections is pivotably supported to said wing by a pin-and-slot arrangement whereby said one hinged section is constrained for reciprocable movement in a direction parallel to the longitudinal axis of said fuselage.

4. The aircraft of claim 2, wherein one of said hinged sections is pivotably supported to said wing by a pin-and-slot arrangement whereby one region of said one hinged section is constrained for reciprocable movement in a plane substantially parallel to said first plane.

5. The aircraft of claim 1, wherein said propulsion means at said fuselage rear end comprises a propeller rotatable in a plane substantially normal to said first plane, and said fuselage comprises necked surface means, disposed forwardly of said rear end, for increasing the velocity of ambient air flowing over said fuselage so that greater thrust may be developed at said propeller when said aircraft is in motion.

6. The aircraft of claim 5, wherein said power-generating means comprises power take-off means coupled with each of said propeller means.

7. The aircraft of claim 6, and further comprising clutch means selectively coupling said power take-off means with said propeller.

8. The aircraft of claim 1, wherein said power-generating means comprises power take-off means coupled with each of said propeller means.

9. The aircraft of claim 1, wherein at least one case is attached to a forward portion of said fuselage to accommodate weapons, missiles or the like.

10. The aircraft of claim 1, wherein said power-generating means comprises turbine means and power take-off means for selectively driving said propeller means during vertical take-off and landing.

11. The aircraft of claim 10, wherein said propulsion means comprises exhaust nozzle means and means for pivotally mounting said exhaust nozzle means on said fuselage rear end.

12. The aircraft of claim 10, wherein said turbine means includes:
    (a) a multi-stage compressor,
    (b) a multi-stage turbine, and
    (c) at least one burner means located between said multi-stage compressor and said multi-stage turbine,
    and wherein one stage of said multi-stage compressor comprises said aerodynamic composite airfoil, said propeller means and said means for selectively altering said lower camber curvature of said wings.

13. The aircraft of claim 1, wherein each said wing further comprises an angular stabilizer and rudder located at the free end of said wing at an angle of 45°–85° between the vertical and lateral axes of said wing.

14. The aircraft of claim 13, wherein said angular stabilizer and rudder extends upwardly from said wing, and is supported on said wing on a surface thereof opposite said propeller means

* * * * *

UNITED STATES PATENT AND TRADEMARK OFFICE
CERTIFICATE OF CORRECTION

PATENT NO. : 4,789,115

DATED : Dec. 6, 1988

INVENTOR(S) : KOUTSOUPIDIS, THEODORE

It is certified that error appears in the above-identified patent and that said Letters Patent is hereby corrected as shown below:

COLUMN 2, LINE 40,41 SHOULD READ:

"rotating counter-clock-wise while the left rotor 1 is shown to be rotating clock-wise."

Please change the inventor's address to read

"KECROPOS 39,
GLYFADA,
ATHENS 166-75,
GREECE."

Signed and Sealed this

Twenty-fourth Day of April, 1990

Attest:

HARRY F. MANBECK, JR.

*Attesting Officer*   *Commissioner of Patents and Trademarks*